(12) United States Patent
Inai et al.

(10) Patent No.: US 9,649,915 B2
(45) Date of Patent: May 16, 2017

(54) VEHICLE DOOR

(71) Applicant: HONDA MOTOR CO., LTD., Minato-Ku, Tokyo (JP)

(72) Inventors: Yohei Inai, Wako (JP); Osamu Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/916,453

(22) PCT Filed: Aug. 21, 2014

(86) PCT No.: PCT/JP2014/071855
§ 371 (c)(1),
(2) Date: Mar. 3, 2016

(87) PCT Pub. No.: WO2015/033789
PCT Pub. Date: Mar. 12, 2015

(65) Prior Publication Data
US 2016/0214469 A1 Jul. 28, 2016

(30) Foreign Application Priority Data

Sep. 3, 2013 (JP) .................................. 2013-182389

(51) Int. Cl.
*B60J 5/04* (2006.01)
*B60J 1/17* (2006.01)
*E06B 3/44* (2006.01)

(52) U.S. Cl.
CPC .............. *B60J 5/0419* (2013.01); *B60J 1/17* (2013.01); *B60J 5/0412* (2013.01); *E06B 3/4407* (2013.01)

(58) Field of Classification Search
CPC .......... B60J 5/0419; B60J 1/17; B60J 5/0412; E06B 3/4407
(Continued)

(56) References Cited

U.S. PATENT DOCUMENTS 2,361,608 A * 10/1944 Doty ........................ B60J 10/74
49/376
4,575,968 A * 3/1986 Mariel ................... B60J 5/0402
296/146.5
(Continued)

FOREIGN PATENT DOCUMENTS

EP 1 253 035 A2 10/2002
JP 04-257731 A 9/1992
(Continued)

*Primary Examiner* — Jerry Redman
(74) *Attorney, Agent, or Firm* — Carrier Blackman & Associates, P.C.; Joseph P. Carrier; Jingli Wang

(57) ABSTRACT

A vehicle door is provided with: a main sash that is disposed above a door main body and that encircles a window opening; and an auxiliary sash of which the upper end abuts the main sash. The auxiliary sash is provided with: a second vehicle interior wall abutting a first vehicle interior wall of the main sash; a second vehicle exterior wall abutting a first vehicle exterior wall; and a second bottom wall coupling the second vehicle interior wall and the second vehicle exterior wall. A notch that is notched alongside the first vehicle exterior wall is formed solely at the second vehicle exterior wall. The bottom end of the notch is disposed below the tip side of the second bottom wall and the top side of the second vehicle interior wall formed contiguously.

11 Claims, 6 Drawing Sheets

(58) Field of Classification Search
USPC ....... 49/502, 440; 296/146.5, 146.15, 146.16
See application file for complete search history.

(56) References Cited

U.S. PATENT DOCUMENTS

| | | | | |
|---|---|---|---|---|
| 5,139,307 | A * | 8/1992 | Koops | B60J 10/78 296/201 |
| 5,524,388 | A * | 6/1996 | Chowdhury | B60J 1/17 49/374 |
| 5,560,152 | A * | 10/1996 | Haner | B60J 1/17 49/327 |
| 7,152,373 | B2 * | 12/2006 | Hoffman | B60J 5/0402 296/146.1 |
| 7,874,104 | B2 * | 1/2011 | Kimoto | B60J 1/10 296/146.5 |
| 9,132,720 | B2 * | 9/2015 | Yokota | B60J 5/0408 |
| 2003/0089044 | A1 * | 5/2003 | Okahara | E05F 11/382 49/414 |
| 2006/0156632 | A1 * | 7/2006 | Ruppert | B29C 45/14377 49/502 |
| 2007/0084130 | A1 * | 4/2007 | Gaustad | B60J 1/17 49/502 |
| 2007/0125004 | A1 * | 6/2007 | Conner | B60J 10/80 49/502 |
| 2009/0038232 | A1 * | 2/2009 | Kimoto | B60J 5/0405 49/502 |
| 2009/0145043 | A1 * | 6/2009 | Yamashita | B60J 10/21 49/502 |
| 2010/0123336 | A1 * | 5/2010 | Eckart | B60J 1/10 296/201 |
| 2011/0099912 | A1 * | 5/2011 | Ohtake | B60J 5/0402 49/502 |
| 2015/0013233 | A1 * | 1/2015 | Costigan | B60J 5/0468 49/502 |
| 2015/0089878 | A1 * | 4/2015 | Otsuka | B60J 10/21 49/440 |
| 2015/0135600 | A1 * | 5/2015 | Yokota | B60J 5/0412 49/502 |

FOREIGN PATENT DOCUMENTS

| | | |
|---|---|---|
| JP | H04-137916 U | 12/1992 |
| JP | 2006-137346 A | 6/2006 |
| JP | 2007-176193 A | 7/2007 |
| JP | 2014-118010 A | 6/2014 |
| WO | 2012/073600 A1 | 6/2012 |

* cited by examiner

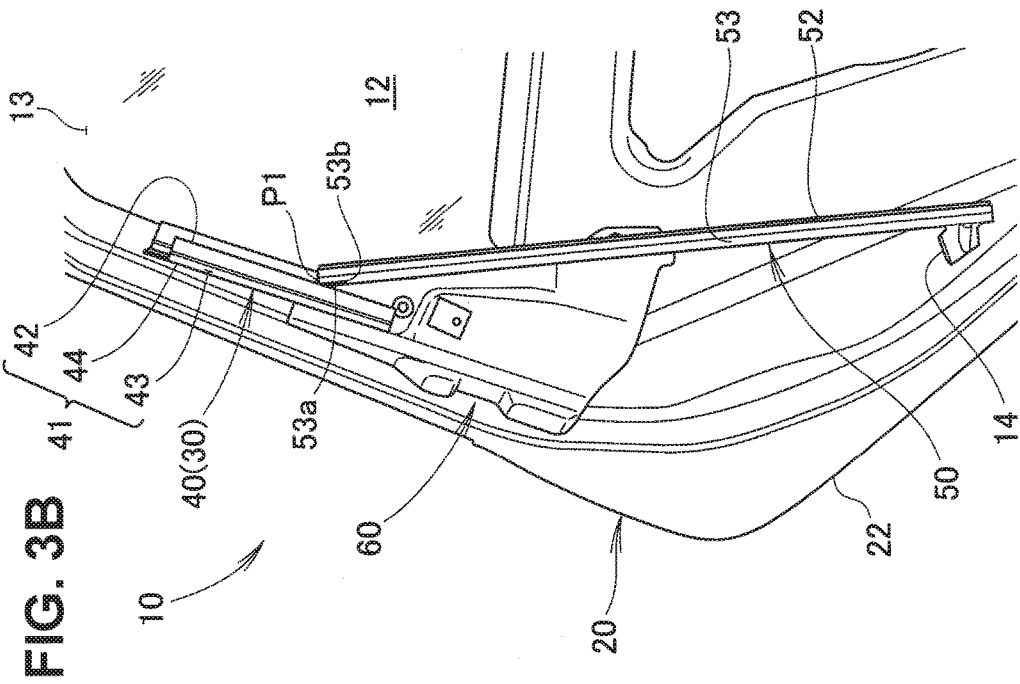
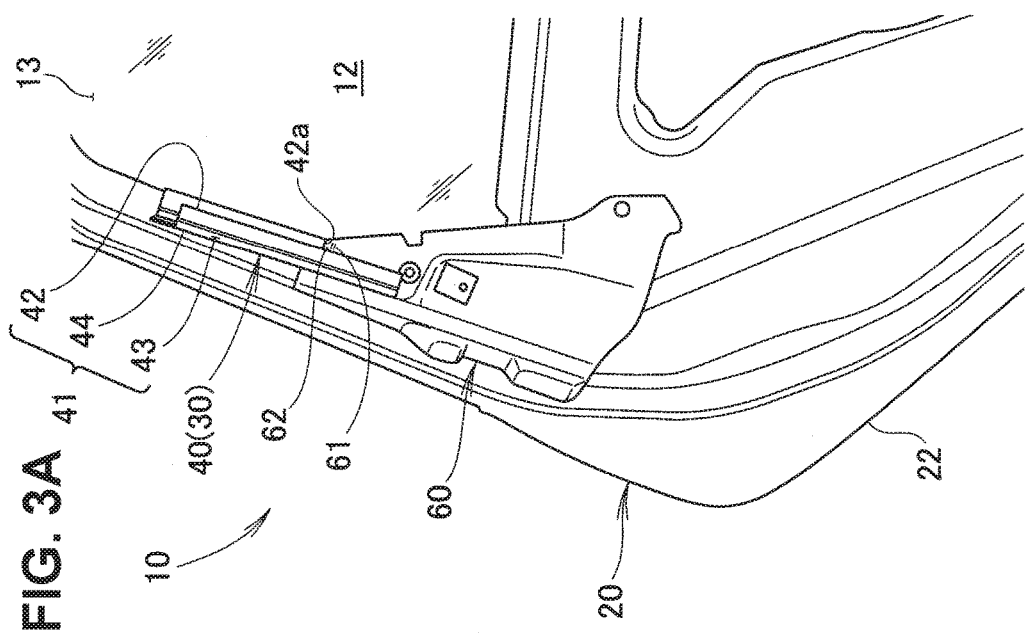

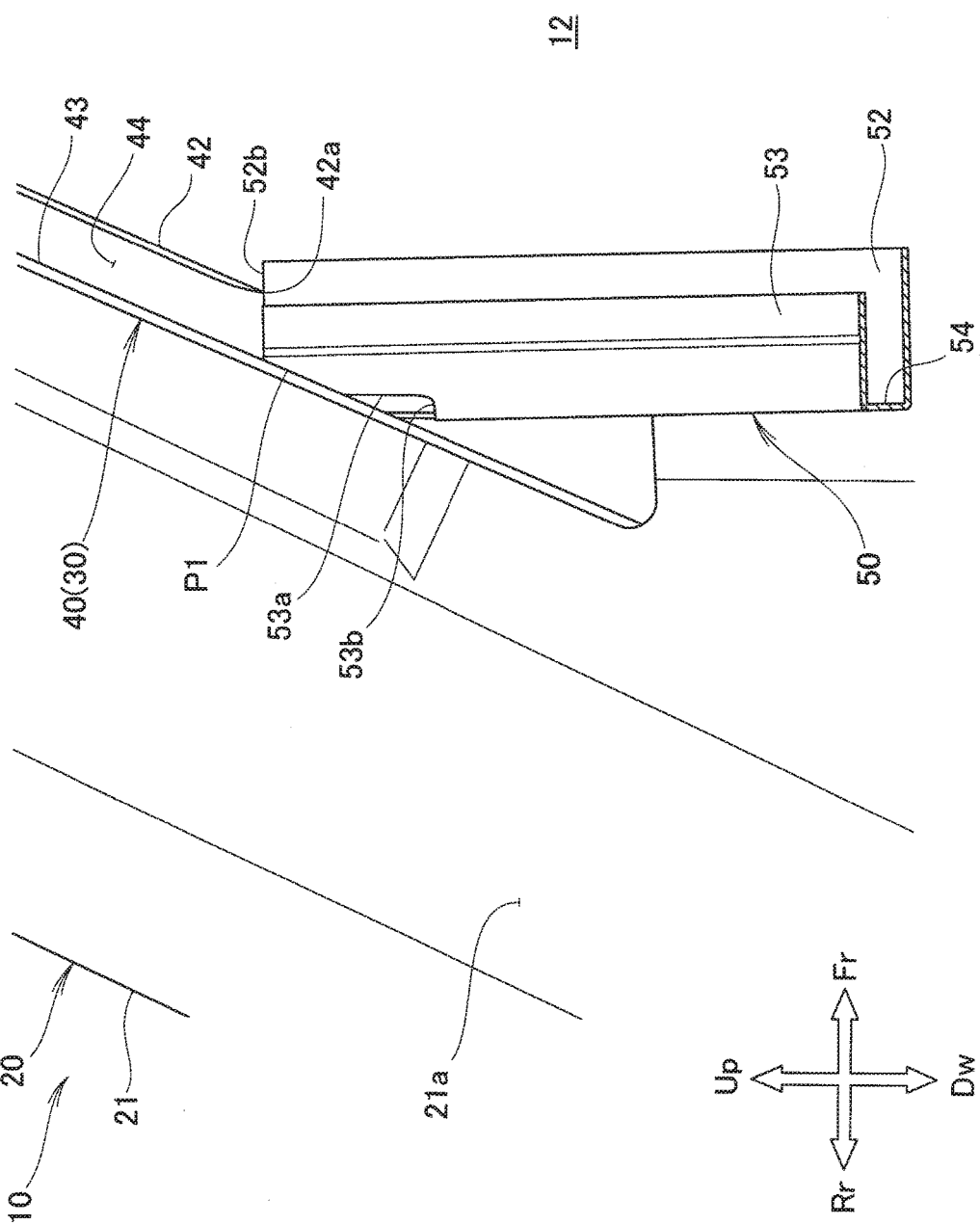

VEHICLE DOOR

TECHNICAL FIELD

The present invention relates to a vehicle door provided with a main sash and an auxiliary sash.

BACKGROUND ART

A sash is provided to the upper section of a door body section of a vehicle door. The sash is a member capable of supporting a closed window panel, and comprises a main sash constituting the outer frame of a door, and an auxiliary sash provided in auxiliary fashion to a portion of the main sash. Patent Literature 1 is prior art related to such a vehicle door.

In a vehicle door such as that indicated in Patent Literature 1, a main sash and auxiliary sash are provided above the door body. The auxiliary sash is mounted so that the upper end abuts the main sash and is open in a substantially U-shaped (substantially C-shaped) configuration toward an openable/closable window panel. In other words, the auxiliary sash includes a vehicle interior wall on the vehicle interior side, a vehicle exterior wall on the vehicle exterior side, and a bottom wall that connects the vehicle interior wall and the vehicle exterior wall. Notches are formed in the upper ends of the U-shaped corners. In other words, a notch is formed in the upper end of the boundary between the vehicle interior wall and the bottom wall, and in the upper end of the boundary between the vehicle exterior wall and the bottom wall. These notches are formed to facilitate cutting for abutting the auxiliary sash against the main sash. A run channel for supporting the window panel is fitted into the substantially U-shaped auxiliary sash.

However, when water has made contact with the vehicle door, some of the droplets that have migrated along the door panel or the like may penetrate to the inner surface side of the substantially U-shaped auxiliary sash from the notches. The droplets that have penetrated to the inner surface side may seep out from between the run channel and the auxiliary sash to the distal end of the vehicle exterior wall or the vehicle interior wall. In particular, the vehicle interior wall is a location near the passenger compartment, and water seepage must be more reliably suppressed.

At this point, it is possible to consider disposing a sealing member so as to surround the notch on the vehicle interior side, or using a run channel with good sealing characteristics. However, when such countermeasures are used, component costs are increased and the cost of the vehicle door overall is increased.

PRIOR ART LITERATURE

Patent Literature 1: JP 2007-176193 A

SUMMARY OF INVENTION

Technical Problem

An object of the present invention is to provide a vehicle door capable of suppressing water seepage from the vehicle interior wall of the auxiliary sash with minimal increase in the component cost.

Solution to Problem

In accordance with the present invention, there is provided a vehicle door comprising: a main sash disposed above a door body and surrounding a window opening, and an auxiliary sash with an upper end abutting the main sash, characterized in that: the main sash is provided with a U-shaped cross-section part that opens in a substantially U-shaped configuration toward the window opening; the U-shaped cross-section part comprises a first vehicle interior wall on the vehicle interior side, a first vehicle exterior wall on the vehicle exterior side, and a first bottom wall that connects the first vehicle interior wall and the first vehicle exterior wall; the auxiliary sash comprises a second vehicle interior wall abutting the first vehicle interior wall, a second vehicle exterior wall abutting the first vehicle exterior wall, and a second bottom wall that connects the second vehicle interior wall and the second vehicle exterior wall; a notch cut out along the first vehicle exterior wall is formed solely in the second vehicle exterior wall among the second vehicle interior wall and the second vehicle exterior wall; a top side of the second vehicle interior wall is provided contiguously to a top side of the second bottom wall; and the lower end of the notch is positioned below the top side of the second vehicle interior wall and the top side of the second bottom wall.

Preferably, a second notch cut out along the second vehicle interior wall is formed in the first vehicle interior wall.

It is preferable that a reinforcement member be mounted to the surface of the first vehicle interior wall on the vehicle interior side, a cover section extending toward the second vehicle interior wall be provided to the reinforcement member, and a contact section between the first vehicle interior wall and the second vehicle interior wall be covered by the cover section.

Preferably, the cover section is offset toward the vehicle interior with respect to a connecting section in which the reinforcement member is connected to the first vehicle interior wall.

It is preferable that a run channel capable of supporting a window panel be mounted on the U-shaped cross-section part, the run channel be provided with a vehicle interior lip bent back to the first vehicle interior wall on the vehicle interior side, and the lower end of the vehicle interior lip align with the contact section.

It is preferable that a corner garnish for covering the contact section from the vehicle interior side be provided to the surface of the cover section on the vehicle interior side, and the lower end of the vehicle interior lip align with the upper end of the corner garnish.

Preferably, a mounting section for mounting the auxiliary sash to the door body is provided to the second vehicle interior wall.

It is preferable that the second vehicle interior wall be offset toward the vehicle exterior side relative to the first vehicle interior wall, and the mounting section be mounted to the reinforcement member by a fastening member.

Advantageous Effects of Invention

In the present invention, the top side of the second vehicle interior wall (the vehicle interior wall of the auxiliary sash) is provided contiguously to the top side of the second bottom wall (the bottom wall of the auxiliary sash). Additionally, the lower end of the notch formed solely in the second vehicle exterior wall (vehicle exterior wall of the auxiliary sash) is positioned below the top side of the second vehicle interior wall and the top side of the second bottom wall. Water may penetrate from the gap between the first vehicle exterior wall and the second vehicle exterior wall and may migrate around the reverse surface of the second bottom wall. The top side of the second bottom wall and the second vehicle interior wall are positioned above and the notch is not formed in the vehicle interior side, and it is therefore possible to inhibit the penetration of water to the inner surface side of the second vehicle interior wall. A component does not need to be newly added to inhibit the penetration of water, and the component cost can accordingly be kept from increasing. In other words, the vehicle door can be said to be capable of inhibiting water seepage from the vehicle interior wall of the auxiliary sash while keeping the component cost from increasing.

Furthermore, in the present invention, a second notch cut out along the second vehicle interior wall is formed in the first vehicle interior wall. In other words, a notch is formed in the vehicle interior wall on the main sash side. Forming a notch on the main sash side makes it possible to cause the auxiliary sash to reliably abut the main sash without the second vehicle interior wall being notched.

In the present invention, a reinforcement member is mounted to the surface of the first vehicle interior wall on the vehicle interior side. A cover section for covering a contact section between the first vehicle interior wall and the second vehicle interior wall is formed on the reinforcement member. The contact section between the first vehicle interior wall and the second vehicle interior wall is covered by the reinforcement member for reinforcing the first vehicle interior wall. The contact section can be covered by the single member, the reinforcement member, while the strength of the main sash is enhanced.

In the present invention, the cover section is offset toward the vehicle interior with respect to a connecting section in which the reinforcement member is connected to the first vehicle interior wall. The cover section and the second vehicle interior wall are thereby set apart from each other. Setting these components apart makes it possible to facilitate assembly of the auxiliary sash.

In the present invention, a run channel capable of supporting a window panel is mounted on the U-shaped cross-section part of the main sash. The lower end of the vehicle interior lip of the run channel aligns with the contact section between the first vehicle interior wall and the second vehicle interior wall. Since the cover section is offset toward the vehicle interior, when the vehicle interior lip of the run channel is provided as far as the position of the covering section, a problem arises in that the vehicle interior lip increases in size. Aligning the lower end of the vehicle interior lip with the contact section makes it possible to prevent having the vehicle interior lip increase in size and to prevent a step from forming against the lip on the connecting section side.

Additionally, since the lower end of the vehicle interior lip can be brought into contact with the cover section for assembling, positioning during assembly is facilitated and assembling is easier to perform.

In the present invention, a corner garnish for covering the cover section from the vehicle interior side is provided to the surface of the cover section on the vehicle interior side. Additionally, the lower end of the vehicle interior lip is aligned with the upper end of the corner garnish. Covering the cover section (reinforcement member) with the corner garnish makes it possible to increase the attractiveness of the external appearance. When viewed from the vehicle interior side, the vehicle interior lip is contiguously disposed with the corner garnish. This makes it possible to further increase the attractiveness of the external appearance.

In the present invention, a mounting section for mounting the auxiliary sash to the door body is provided to the second vehicle interior wall. A mounting section is provided to the second vehicle interior wall, which has high rigidity, without the formation of a notch. High mounting strength can thereby be obtained.

In the present invention, the second vehicle interior wall is offset toward the vehicle exterior relative to the first vehicle interior wall. Additionally, the mounting section is mounted to the reinforcement member by a fastening member. By having the second vehicle interior wall offset toward the vehicle exterior relative to the first vehicle interior wall, the reinforcement member and the auxiliary sash can be set apart from each other. It is thereby possible to facilitate assembly of the auxiliary sash. Also, a mounting section can be disposed in the gap formed by this offset arrangement. For this reason, the reinforcement member and the auxiliary sash can be securely fastened by the fastening member.

BRIEF DESCRIPTION OF DRAWINGS

FIGS. 3A-3B are views illustrating mounting of the inner panel, the reinforcing member, the main sash, and the auxiliary sash shown in FIG. 2;

FIG. 6 is a view taken in the direction of arrow 6 of FIG. 4.

DESCRIPTION OF EMBODIMENTS

Figure 1:
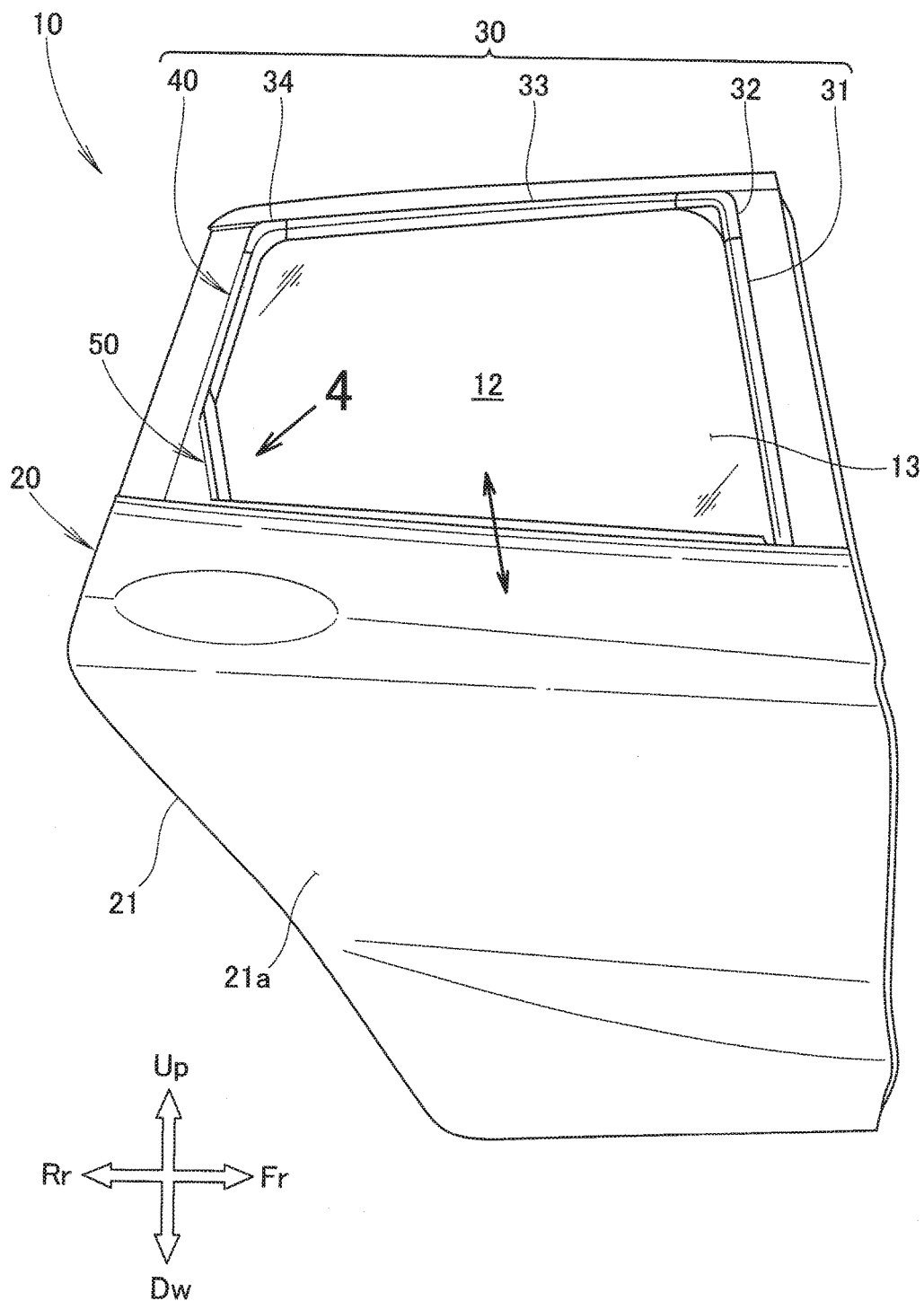
FIG. 1 is a front view of the vehicle door according to an embodiment of the present invention.

Embodiments of the present invention are described below with reference to the accompanying drawings. In the description, left and right indicate left and right with reference to an occupant of a vehicle in which the vehicle door is mounted, and front and rear indicate front and rear with reference to the travel direction of the vehicle. In the drawings, Fr indicates front, Rr indicates rear, Ce indicates lateral center, Up indicates up, and Dw indicates down.

<Embodiments>

Figure 2:
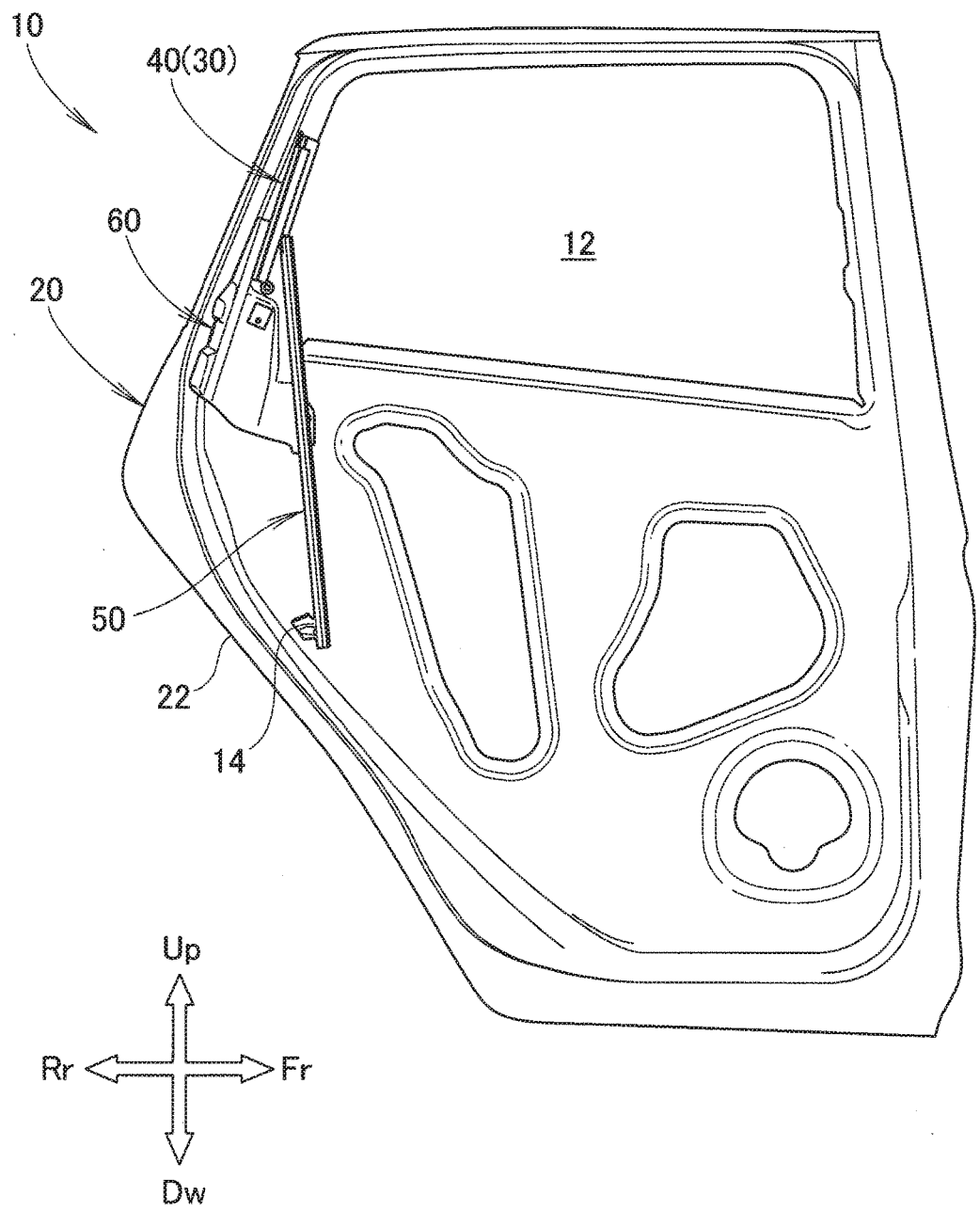
FIG. 2 is a front view with the outer panel removed from the vehicle door shown in FIG. 1.

Reference will be made to FIGS. 1 and 2. A door mounted on the rear right side of a vehicle body is shown as an example of a vehicle door 10. The vehicle door 10 includes a door body 20 swingably mounted on the vehicle body, a main sash 30 in a U shape (substantially C shape) facing downward disposed above the door body 20, an auxiliary sash 50 abutting the rear lower end of main sash 30, and a window panel 13 retractable toward a window opening 12 surrounded by the main sash 30 and the auxiliary sash 50.

The door body 20 is composed of an outer panel 21 on the vehicle exterior side and an inner panel 22 on the vehicle interior side, one superimposed on the other. The door body 20 is formed in a closed sectional shape by superimposition of the two panels.

In particular, the main sash 30 is composed of a plurality of contiguously disposed members, as shown in FIG. 1. More specifically, the main sash 30 includes a front edge section 31 extending along the end section of the front side of the door body 20, a front corner section 32 disposed in a substantially L-shaped configuration along the corner of the window opening 12 from the upper end of the front edge section 31, an upper edge section 33 extending rearward along the upper edge of the window opening 12 from the rear end of the front corner section 32, a rear corner section 34 disposed in an L shape along the corner of the window opening 12 from the rear end of the upper edge section 33, and a rear edge section 40 extending along the rear end of the door body 20 from the lower end of the rear corner section 34.

The auxiliary sash 50 is a roll-formed article extending toward the rear edge section 40 of the main sash 30. The auxiliary sash 50 is disposed substantially parallel to the front edge section 31 along the direction of retraction (see arrow) of the window panel 13.

Reference will be made to FIG. 3A. A reinforcement member 60 is joined to the inner panel 22. The lower end of the rear edge section 40 is superimposed on the reinforcement member 60 as viewed from the front face of the vehicle door 10 (the vehicle body, with the vehicle door 10 mounted, viewed from the side face). In other words, the inner panel 22, the reinforcement member 60, and the rear edge section 40 (main sash 30) are superimposed in the stated sequence from the vehicle interior side toward the vehicle exterior side. The reinforcement member 60 is a steel member formed by press-forming.

Referring additionally to FIG. 3B, when the vehicle door 10 is viewed from the front surface, a contact section P1 in which the upper end of the auxiliary sash 50 makes contact against the rear edge section 40 of the main sash 30 is superimposed on the reinforcement member 60. In other words, the upper end of the auxiliary sash 50 abuts the rear edge section 40 of the main sash 30 on the reinforcement member 60. Expressed differently, the inner panel 22, the reinforcement member 60, and the auxiliary sash 50 are superimposed in the stated sequence from the vehicle interior side toward the vehicle exterior side.

A separate mounting bracket 14 is joined to the lower part of the auxiliary sash 50. The auxiliary sash 50 is mounted to the inner panel 22 via the mounting bracket 14 and a later-described mounting section.

Figure 4:
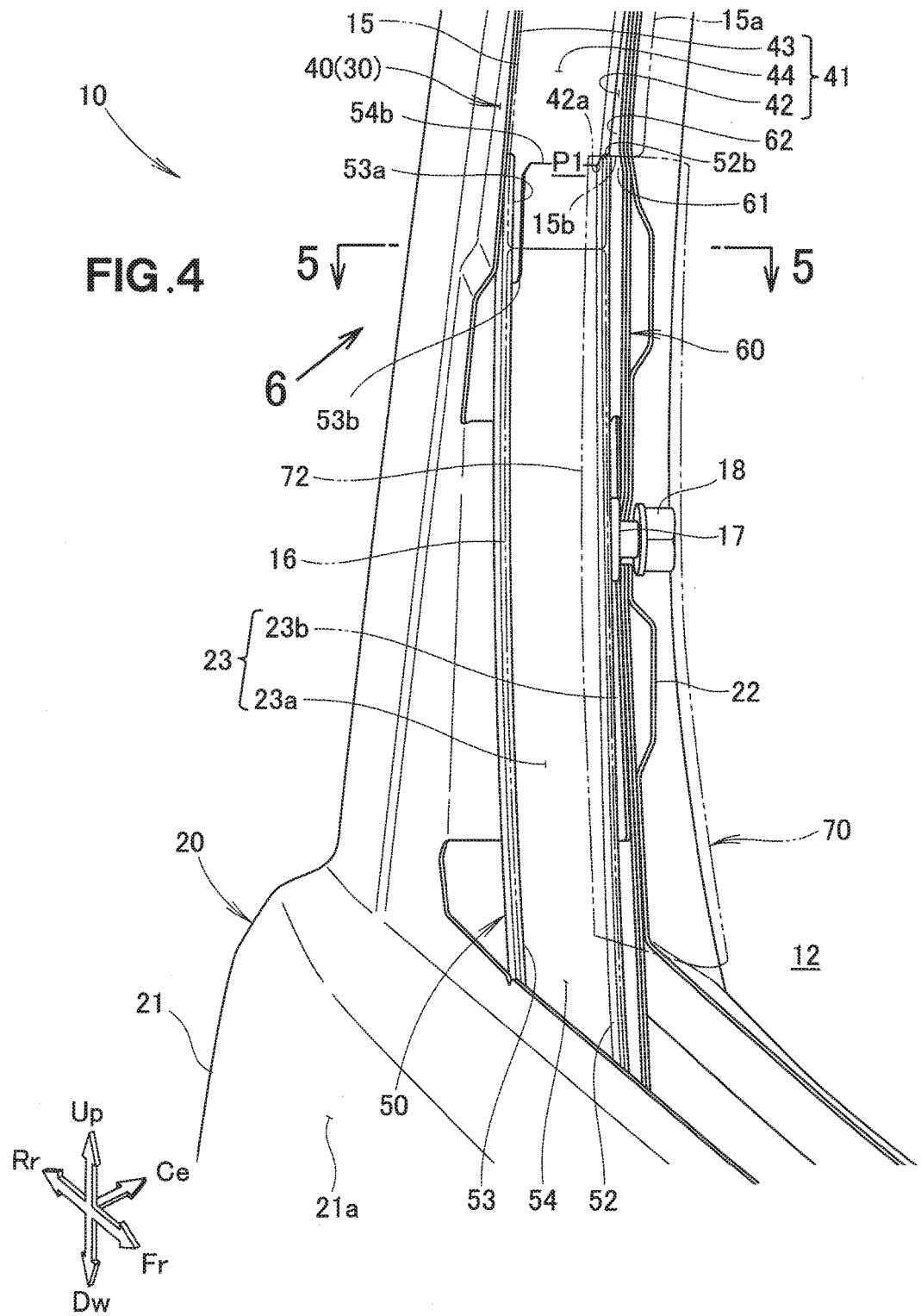
FIG. 4 is a view taken in the direction of arrow 4 of FIG. 1.
Figure 5:
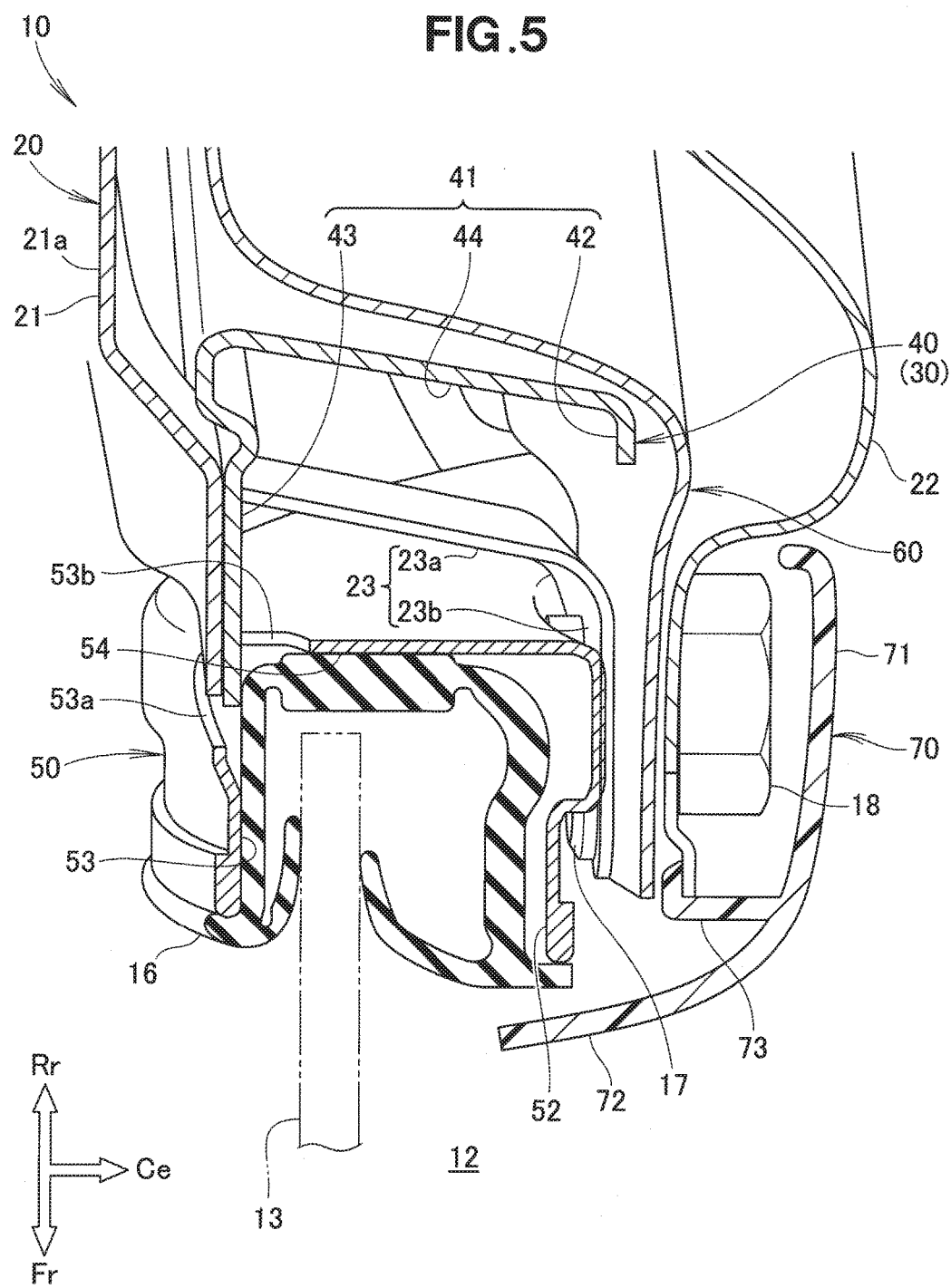
FIG. 5 is a cross-sectional view taken along line 5-5 of FIG. 4.

Reference will be made to FIGS. 4 and 5. A corner garnish 70 is mounted as a decorative component on the surface of the inner panel 22 on the vehicle interior side. The corner garnish 70 includes a base 71 disposed along the surface of the inner panel 22 on the vehicle interior side, and an extension 72 extending from the front end of the base 71 forward toward the vehicle exterior side. A pawl 73 formed on the reverse surface of the base 71 is latched to the inner panel 22.

An outer panel bend section 23 that includes a first bend section 23a bent from a general surface section 21a of the outer panel 21 toward the reinforcement member 60, and a second bend section 23b bent from the distal end of the first bend section 23a along the surface of the reinforcement member 60 on vehicle exterior side. It can also be said that the outer panel bend section 23 is formed in a substantially L-shaped configuration from the general surface section 21a of the outer panel 21 toward the vehicle interior.

The rear edge section 40 (main sash 30) is provided with a U-shaped cross-section part 41 (C-shaped cross section 41) that opens in a substantially U-shaped (substantially C-shaped) configuration toward the window opening 12. The U-shaped cross-section part 41 includes a first vehicle interior wall 42 on the vehicle interior side, a first vehicle exterior wall 43 on the vehicle exterior side, and a first bottom wall 44 that connects the first vehicle interior wall 42 and the first vehicle exterior wall 43. In particular, a main-section run channel 15 (run channel 15) for supporting a window panel is fitted into the U-shaped cross-section part 41, as indicated by the imaginary line in FIG. 4. A lip-shaped vehicle interior lip 15a bent back from the edge of the first vehicle interior wall 42 toward the vehicle interior side is formed on the main-section run channel 15.

The auxiliary sash 50 includes a second vehicle interior wall 52 that abuts the first vehicle interior wall 42, a second vehicle exterior wall 53 that abuts the first vehicle exterior wall 43, and a second bottom wall 54 that connects the second vehicle interior wall 52 and the second vehicle exterior wall 53. The top side 52b of the second vehicle interior wall 52 is contiguously provided to the top side 54b of the second bottom wall 54. An auxiliary run channel 16 for supporting a window panel is fitted into the auxiliary sash 50.

A mounting section 17 for mounting the auxiliary sash 50 to the inner panel 22 is joined to the surface of the vehicle interior side of the second vehicle interior wall 52 of the auxiliary sash 50. A fastening member 18 is fastened to the mounting section 17 joined to the auxiliary sash 50, whereby the outer panel 21 (outer panel bend section 23), the reinforcement member 60, and the inner panel 22 are integrally fastened in the stated sequence from the vehicle exterior side. In other words, the auxiliary sash 50, the outer panel 21, the reinforcement member 60, and the inner panel 22 are brought together in the mounting section 17.

Referring to FIG. 6 as well, a first notch 53a (notch 53a) cut out along the first vehicle exterior wall 43 is formed only in the second vehicle exterior wall 53 among the second vehicle interior wall 52 and the second vehicle exterior wall 53. Also, a second notch 42a cut out along the second vehicle interior wall 52 is formed in the first vehicle interior wall 42. A lower end 53b of the first notch 53a is positioned below a top side 52b of the second vehicle interior wall 52 and a top side 54b of the second bottom wall 54.

A lower end 15b of the vehicle interior lip 15a is aligned with the contact section P1 between the first vehicle interior wall 42 and the second vehicle interior wall 52. In other words, the top side 54b of the second bottom wall 54, the top side 52b of the second vehicle interior wall 52, and the lower end 15b of the vehicle interior lip 15a are contiguous.

The reinforcement member 60 is mounted on the surface of the first vehicle interior wall 42 on the vehicle interior side. A cover section 61 extending at an incline toward the second vehicle interior wall 52 is formed on the other hand the reinforcement member 60. The contact section P1 is covered by the cover section 61. Referring to FIG. 3A as well, the cover section 61 is offset toward the vehicle interior with respect to a connecting section 62 in which the reinforcement member 60 is connected to the first vehicle interior wall 42. The boundary between the cover section 61 and the connecting section 62 is aligned with the portion in which the contact section P1 is formed.

The cover section 61 is covered by the corner garnish 70 from the vehicle interior side. The lower end 15b of the vehicle interior lip 15a is covered by the corner garnish 70 from the vehicle interior side.

Returning to FIG. 5, water may penetrate from the gap between the first vehicle exterior wall 43 and the second vehicle exterior wall 53 and may migrate around the reverse surface of the second bottom wall 54. Since a notch (first notch 53a) is formed only in the vehicle exterior side, it is possible to inhibit the penetration of water to the inner side of the second vehicle interior wall 52. Since no components need be newly added to inhibit the penetration of water, the component cost can be kept from increasing. In other words, the vehicle door can 10 be regarded to be capable of inhibiting water seepage from the second vehicle interior wall 52 (the vehicle interior wall of the auxiliary sash 50) while keeping component cost from increasing.

Furthermore, the mounting section 17 for mounting the auxiliary sash 50 to the door body 20 (inner panel 22) is joined to the second vehicle interior wall 52. The mounting section 17 is provided to the second vehicle interior wall 52, which has high rigidity, without a notch being formed. High mounting strength can thereby be obtained.

Furthermore, the second vehicle interior wall 52 is offset toward the vehicle exterior relative to the first vehicle interior wall 42. Additionally, the mounting section 17 is mounted on the reinforcement member 60 using the fastening member 18. The second vehicle interior wall 52 being offset toward the vehicle exterior relative to the first vehicle interior wall 42 makes it possible to set the reinforcement member 60 and the auxiliary sash 50 apart from each other. The assembly characteristics of the auxiliary sash 50 can thereby be enhanced.

Furthermore, the mounting section 17 can be disposed in the gap formed by this offset arrangement. For this reason, the reinforcement member 60 and the auxiliary sash 50 can be securely fastened by the fastening member.

Referring to FIG. 4 as well, the second notch 42a cut out along the second vehicle interior wall 52 is formed in the first vehicle interior wall 42. Notching the main sash 30 side makes it possible to reliably abut the auxiliary sash 50 against the main sash 30 without a notch being formed in the second vehicle interior wall 52.

Furthermore, the reinforcement member 60 is mounted on the surface of the first vehicle interior wall 42 on the vehicle interior side, and the cover section 61 for covering the contact section P1 between the first vehicle interior wall 42 and the second vehicle interior wall 52 is formed on the reinforcement member 60. The contact section P1 between the first vehicle interior wall 42 and the second vehicle interior wall 52 is covered by the reinforcement member 60 for reinforcing the first vehicle interior wall 42. The contact section P1 can be covered while the strength of the main sash 30 is increased by a single member, i.e., the reinforcement member 60.

Moreover, the cover section 61 is offset toward the vehicle interior with respect to the connecting section 62 in which the reinforcement member 60 is connected to the first vehicle interior wall 42. The cover section 61 and the second vehicle interior wall 52 are thereby set apart from each other. This set-apart arrangement makes it possible to improve the assembly characteristics of the auxiliary sash 50.

Additionally, the main-section run channel 15 capable of supporting the window panel 13 is mounted to the U-shaped cross-section part 41 of the main sash 30 (rear edge section 40), and the lower end 15b of the vehicle interior lip 15a of the main-section run channel 15 is aligned with the contact section P1 between the first vehicle interior wall 42 and the second vehicle interior wall 52. Since the cover section 61 is offset toward the vehicle interior, the size of the vehicle interior lip 15a is increased when the vehicle interior lip 15a of the main-section run channel 15 is provided as far as the position of the cover section 61. Aligning the lower end 15b of the vehicle interior lip 15a with the contact section P1 makes it possible to prevent the size of the vehicle interior lip 15a from increasing and to prevent a step from being formed with the lip on the connecting section 62 side.

Also, since the lower end 15b of the vehicle interior lip 15a can be assembled on the cover section 61 by being brought into contact therewith, positioning during assembly is facilitated and assembling is easier to perform.

Furthermore, the corner garnish 70 for covering the cover section 61 from the vehicle interior side is provided to the surface of the cover section 61 on the vehicle interior side, and the lower end 15b of the vehicle interior lip 15a is aligned with the upper end of the corner garnish 70. Covering the cover section 61 (reinforcement member 60) with the corner garnish 70 makes it possible to increase the attractiveness of the external appearance. When viewed from the vehicle interior side, the vehicle interior lip 15a is contiguously disposed with the corner garnish 70. This makes it possible to further increase the attractiveness of the external appearance.

The vehicle door according to the present invention was described using a rear vehicle door as an example, but application as a front vehicle door is also possible. In such a case, an auxiliary sash may be provided to the front end side, or other design modifications can be made, as appropriate, for application to a front vehicle door.

INDUSTRIAL APPLICABILITY

The vehicle door of the present invention is advantageous for an automobile.

REFERENCE SIGNS LIST

10: Vehicle door
12: Window opening
15: Main-section run channel (run channel)
15a: Vehicle interior lip
15b: Lower end of the vehicle interior lip
17: Mounting section
18: Fastening member
20: Door body
30: Main sash
41: U-shaped cross-section part
42: First vehicle interior wall
42a: Second notch
43: First vehicle exterior wall
44: First bottom wall
50: Auxiliary sash
52: Second vehicle interior wall
52b: Top side (of the second vehicle interior wall)
53: Second vehicle exterior wall
53a: First notch (notch)
53b: Lower end (of the first notch)
54: Second bottom wall
54b: Top side (of the second bottom wall)
60: Reinforcement member
61: Cover section
62: Connecting section
70: Corner garnish
P1: Contact section

The invention claimed is:

1. A vehicle door comprising:
a main sash disposed above a door body and surrounding a window opening, and
an auxiliary sash with an upper end abutting the main sash,
wherein:
the main sash is provided with a U-shaped cross-section part opening in a substantially U-shaped configuration toward the window opening,
the U-shaped cross-section part comprises a first vehicle interior wall on a vehicle interior side, a first vehicle exterior wall on a vehicle exterior side, and a first bottom wall that connects the first vehicle interior wall and the first vehicle exterior wall, the auxiliary sash comprises a second vehicle interior wall abutting the first vehicle interior wall, a second vehicle exterior wall abutting the first vehicle exterior wall, and a second bottom wall that connects the second vehicle interior wall and the second vehicle exterior wall, a notch is cut out and defined solely in an upper end portion of the second vehicle exterior wall or in the upper end portion of the second vehicle exterior wall and an exterior side part of an upper end portion of the second bottom wall such that the notch extends through the second vehicle exterior wall and along the first vehicle exterior wall, the notch not being defined in the second vehicle interior wall, a top side of the second vehicle interior wall is provided contiguously to a top side of the second bottom wall, and a lower end of the notch is positioned below the top side of the second vehicle interior wall and the top side of the second bottom wall.

2. The vehicle door of claim 1, wherein a second notch is cut out and defined in an end portion of the first vehicle interior wall such that the second notch extends along the second vehicle interior wall.

3. A vehicle door comprising:

a main sash disposed above a door body and surrounding a window opening, and an auxiliary sash with an upper end abutting the main sash, wherein:

the main sash is provided with a U-shaped cross-section part opening in a substantially U-shaped configuration toward the window opening, the U-shaped cross-section part comprises a first vehicle interior wall on a vehicle interior side, a first vehicle exterior wall on a vehicle exterior side, and a first bottom wall that connects the first vehicle interior wall and the first vehicle exterior wall, the auxiliary sash comprises a second vehicle interior wall abutting the first vehicle interior wall, a second vehicle exterior wall abutting the first vehicle exterior wall, and a second bottom wall that connects the second vehicle interior wall and the second vehicle exterior wall, a notch is cut out and defined in an upper end portion of the second vehicle exterior wall such that the notch extends along the first vehicle exterior wall, the notch not being defined in the second vehicle interior wall, a top side of the second vehicle interior wall is provided contiguously to a top side of the second bottom wall, and a lower end of the notch is positioned below the top side of the second vehicle interior wall and the top side of the second bottom wall, a second notch is cut out and defined in an end portion of the first vehicle interior wall such that the second notch extends along the second vehicle interior wall, and a reinforcement member is mounted to a surface of the first vehicle interior wall on the vehicle interior side, a cover section extending toward the second vehicle interior wall is provided to the reinforcement member, and a contact section between the first vehicle interior wall and the second vehicle interior wall is covered by the cover section.

4. The vehicle door of claim 3, wherein the cover section is offset toward the vehicle interior with respect to a connecting section in which the reinforcement member is connected to the first vehicle interior wall.

5. The vehicle door of claim 4, wherein a mounting section for mounting the auxiliary sash to the door body is provided to the second vehicle interior wall.

6. The vehicle door of claim 4, wherein a run channel capable of supporting a window panel is mounted on the U-shaped cross-section part, the run channel is provided with a vehicle interior lip bent back to the first vehicle interior wall on the vehicle interior side, and the lower end of the vehicle interior lip aligns with the contact section.

7. The vehicle door of claim 6, wherein a mounting section for mounting the auxiliary sash to the door body is provided to the second vehicle interior wall.

8. The vehicle door of claim 6, wherein a corner garnish for covering the contact section from the vehicle interior side is provided to the surface of the cover section on the vehicle interior side, and the lower end of the vehicle interior lip aligns with the upper end of the corner garnish.

9. The vehicle door of claim 8, wherein a mounting section for mounting the auxiliary sash to the door body is provided to the second vehicle interior wall.

10. The vehicle door of claim 3, wherein a mounting section for mounting the auxiliary sash to the door body is provided to the second vehicle interior wall.

11. The vehicle door of claim 10, wherein the second vehicle interior wall is offset toward the vehicle exterior side relative to the first vehicle interior wall, and the mounting section is mounted to the reinforcement member by a fastening member.

* * * * *